A. F. HARTER.
COMBINED COOKING AND HEATING STOVE.
APPLICATION FILED JUNE 22, 1912.
1,175,443.
Patented Mar. 14, 1916.
5 SHEETS—SHEET 3.
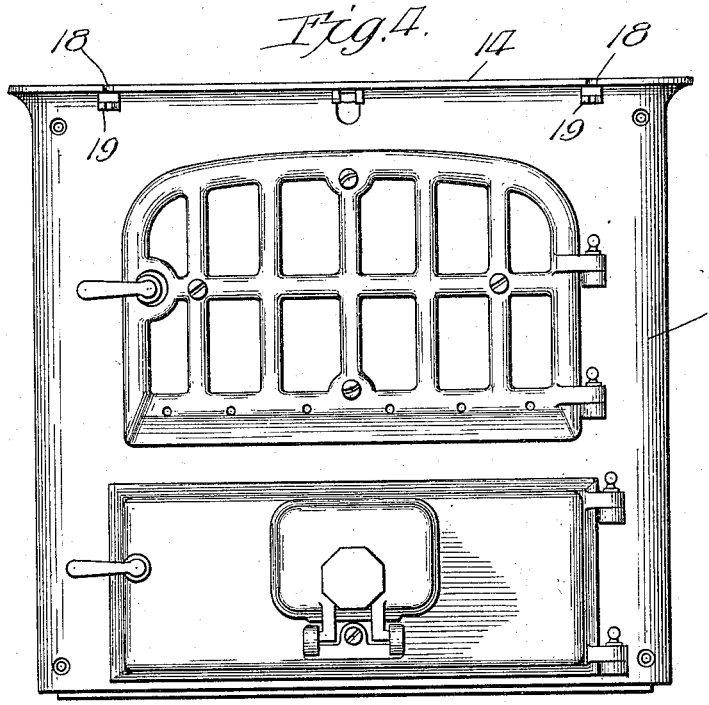
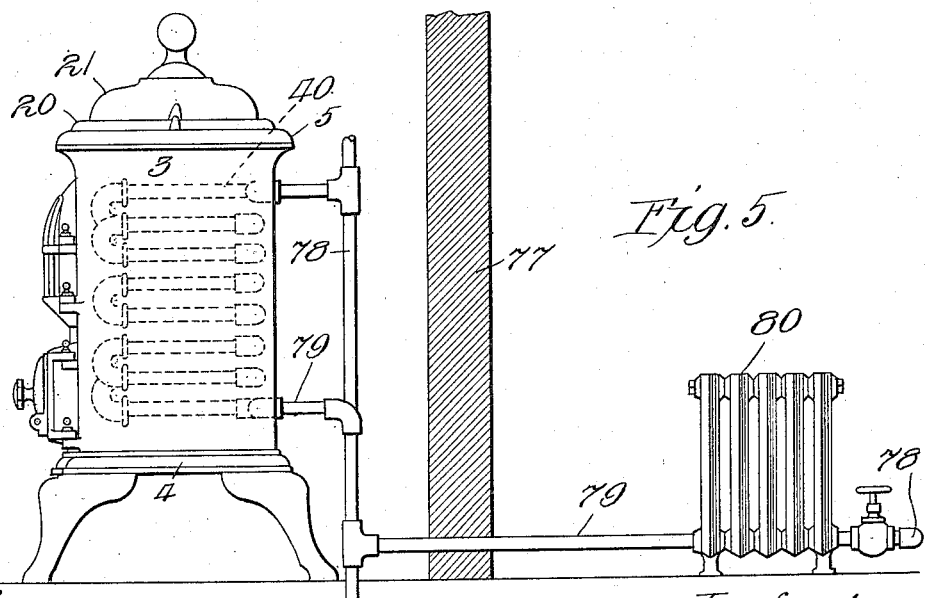

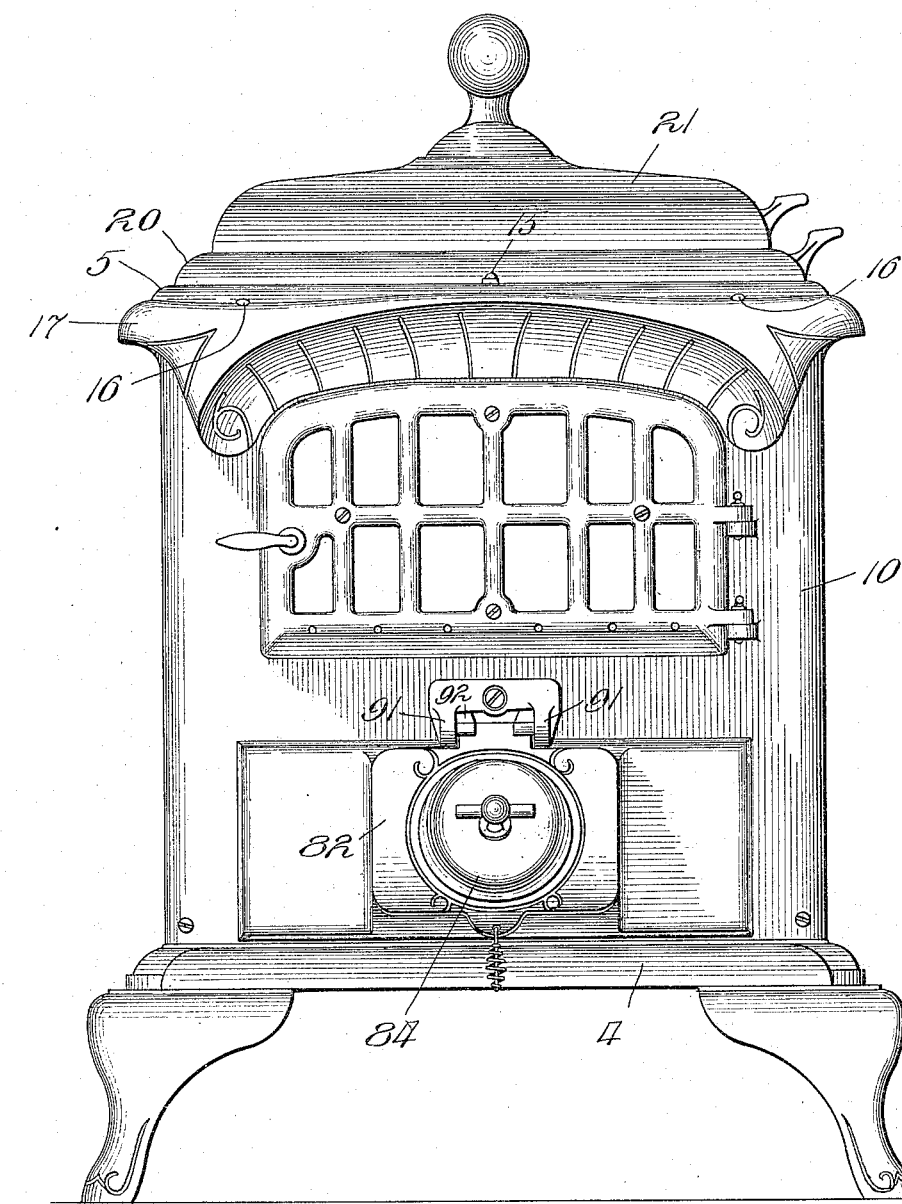

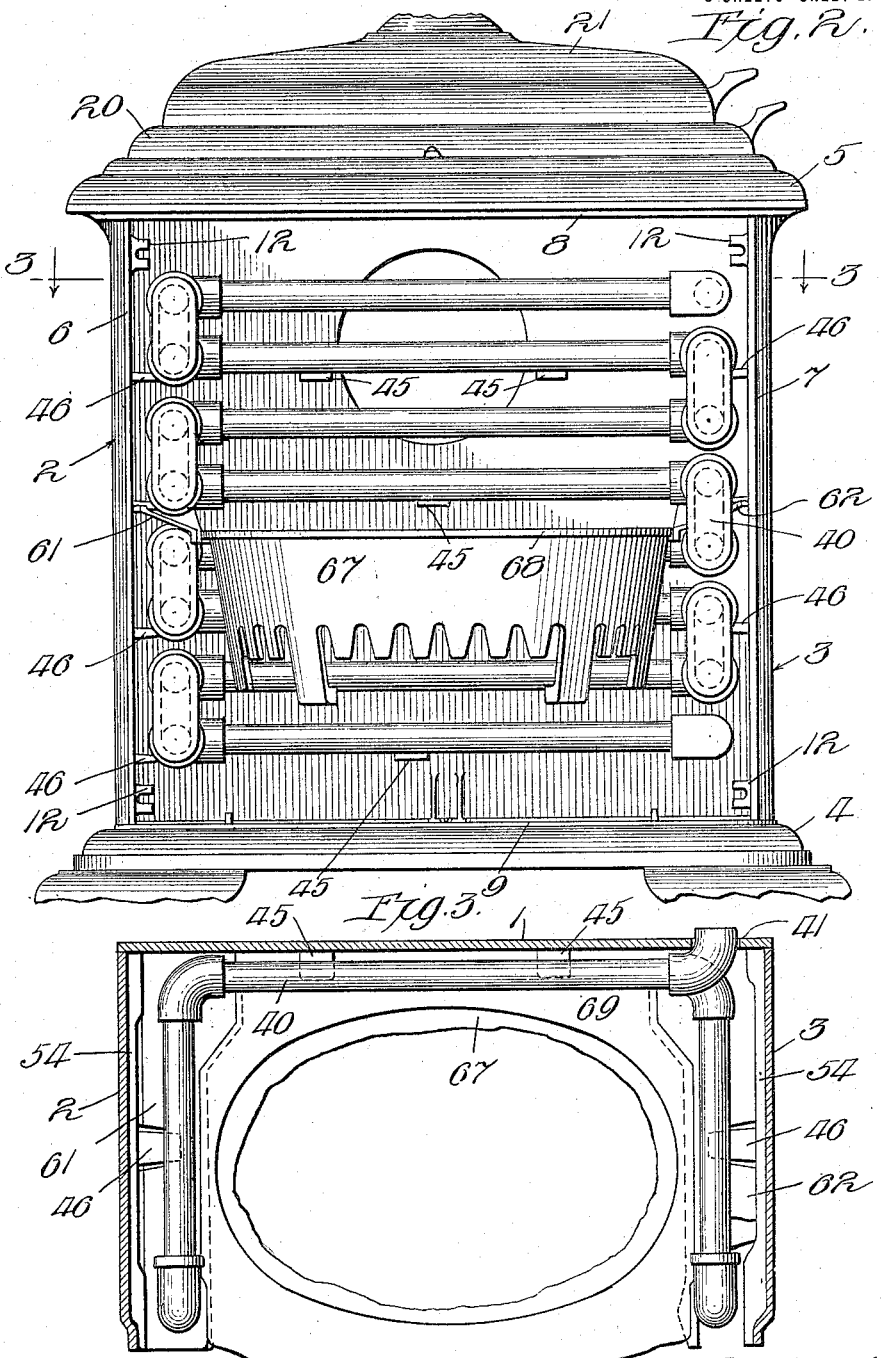

A. F. HARTER.
COMBINED COOKING AND HEATING STOVE.
APPLICATION FILED JUNE 22, 1912.
1,175,443.
Patented Mar. 14, 1916.
5 SHEETS—SHEET 4.
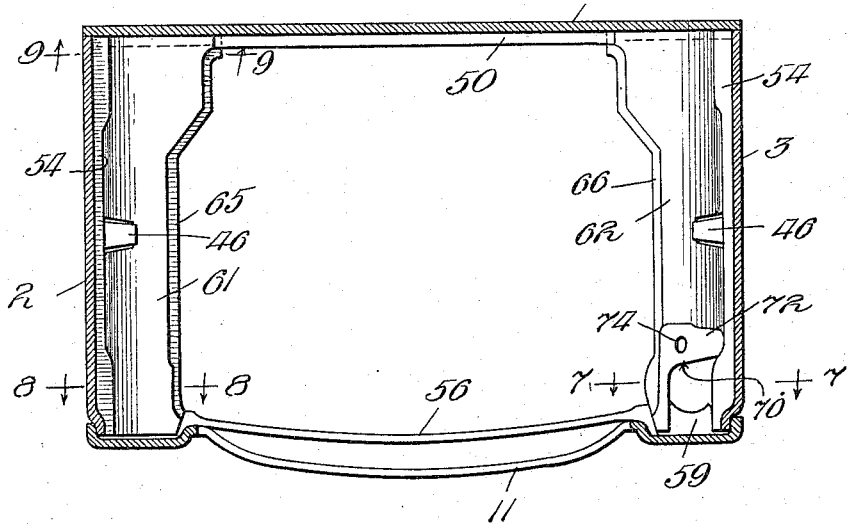
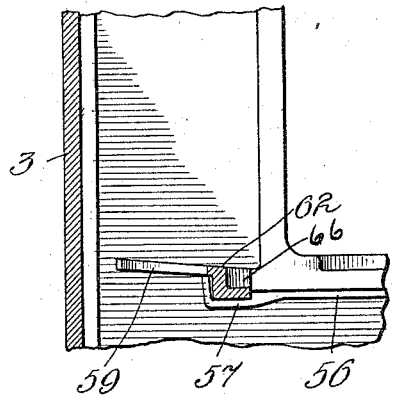
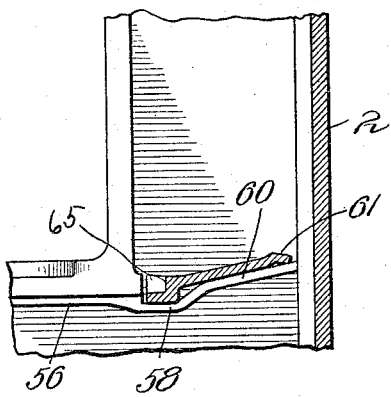
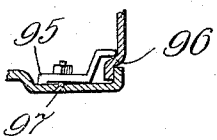
Witnesses:
Harry S. Gaither.
Ruby V. Brydges.
Inventor:
Augustus F. Harter
by Chamberlin & Brendenreul
Attys A. F. HARTER.
COMBINED COOKING AND HEATING STOVE.
APPLICATION FILED JUNE 22, 1912.
1,175,443.
Patented Mar. 14, 1916.
5 SHEETS—SHEET 5.
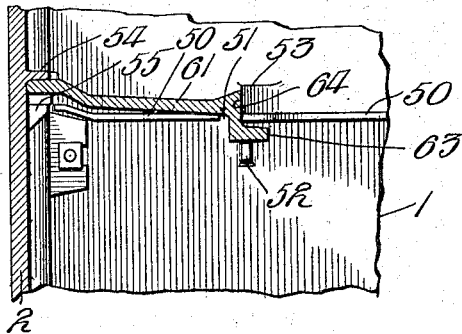
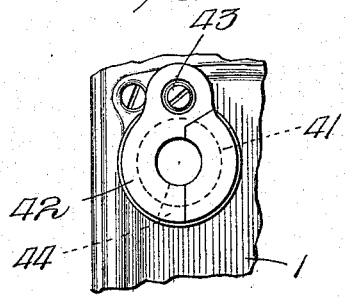
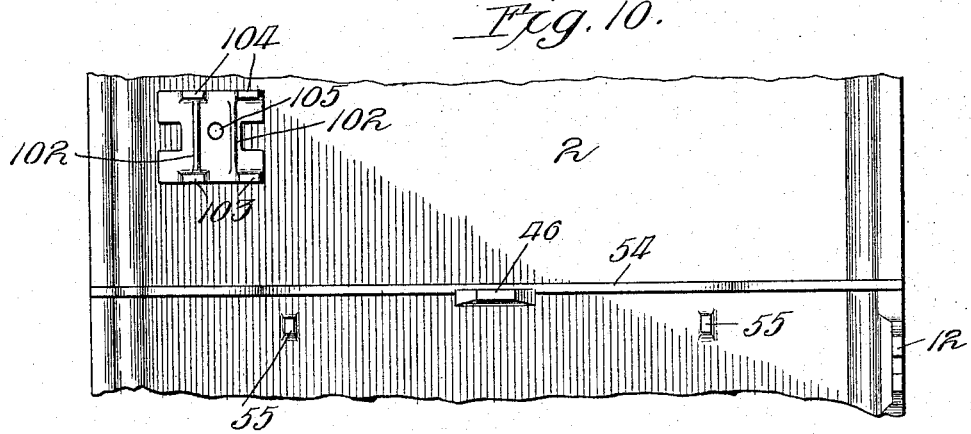
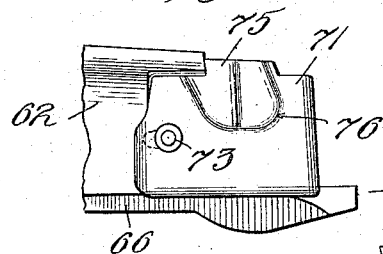
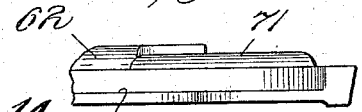

UNITED STATES PATENT OFFICE.

AUGUSTUS F. HARTER, OF CHICAGO, ILLINOIS, ASSIGNOR TO CRIBBEN & SEXTON COMPANY, OF CHICAGO, ILLINOIS, A CORPORATION OF ILLINOIS.

COMBINED COOKING AND HEATING STOVE.

1,175,443.             Specification of Letters Patent.             Patented Mar. 14, 1916.

Application filed June 22, 1912. Serial No. 705,247.

*To all whom it may concern:*

Be it known that I, AUGUSTUS F. HARTER, a citizen of the United States, residing at Chicago, county of Cook, State of Illinois, have invented a certain new and useful Improvement in Combined Cooking and Heating Stoves, and declare the following to be a full, clear, and exact description of the same, such as will enable others skilled in the art to which it pertains to make and use the same, reference being had to the accompanying drawings, which form a part of this specification.

My invention has for its object to produce a simple and novel stove adapted for both cooking and heating purposes.

A further object of my invention is to produce a simple and novel stove structure which may easily and conveniently be changed so as to adapt the stove to use either wood or coal as a fuel.

A further object of my invention is to produce a simple and novel stove having a large water-heating capacity so as to provide hot water for various purposes including the heating of rooms by means of hot water radiators.

A further object of my invention is to produce a simple and novel stove having a relatively large heating coil, provision being made for permitting the insertion and removal of the coil bodily so as to permit it to be made up and tested before being assembled in the stove.

A further object of my invention is to produce a novel arrangement for supporting a fire pot in a stove having heating coils along several of its walls.

The various features of novelty whereby my invention is characterized will hereinafter be pointed out with particularity in the claims; but, for a full understanding of my invention and of its various objects and advantages, reference may be had to the following detailed description taken in connection with the accompanying drawings, wherein:

Figure 1 is a front elevation of a stove arranged in accordance with a preferred form of my invention adapted for burning wood; Fig. 2 is a front view of the stove with the stove front removed, the stove being provided with a fire pot to adapt it to the burning of coal; Fig. 3 is a transverse section on line 3—3 of Fig. 2; Fig. 4 is a front elevation of the stove front which is used on the stove when the latter is equipped with the fire pot as illustrated in Fig. 2; Fig. 5 is a side view of the stove on a reduced scale showing the manner of connecting the heating coil therein to a radiator or the like at a remote point as, for example, in a room other than that in which the stove is placed; Fig. 6 is a transverse section through the stove just above the supports for the fire pot, the heating coil and the fire pot being omitted; Fig. 7 is a section on an enlarged scale on line 9—9 of Fig. 6; Fig. 8 is a section on an enlarged scale on line 8—8 of Fig. 6; Fig. 9 is a section on an enlarged scale on line 9—9 of Fig. 6; Fig. 10 is an inside elevation of a portion of the left hand side of the stove, showing the supports for the fire pot strips and one of the supports for the heating coil; Fig. 11 is a plan view on an enlarged scale of the front end of one of the fire pot strips, illustrating the means for adapting it to various conditions encountered; Fig. 12 is a side view of the fragment shown in Fig. 11; Fig. 13 is a horizontal section through one of the front corners of the stove, illustrating a modified arrangement for fastening the front to the sides; Figs. 14 and 15 are a plan and a side view of a clip for holding a copper heating coil in place; Fig. 16 is a detail of the reducer for the opening through which the pipe leading to the heating coil extends.

Referring to the drawings, 1 represents the back and 2 and 3 the sides or ends of a stove.

4 is the bottom or base and 5 is the stationary portion of the top. Along the front edges of the sides or ends and the top are outwardly facing seats 6, 7 and 8, respectively, against which the front of the stove is adapted to fit, the front being thus detachable without removing or displacing the top or the sides. This has several advantages, one of them being that when the stove is to be used as a wood stove, it may be provided with a front such as indicated at 10 in Fig. 1. On the other hand, when it is desired to change the stove into a coal stove the front 10 may easily be replaced by another front, 11, indicated in Fig. 4. Another advantage of the front which is removable without dismounting the top or the sides, is that by removing the front a full opening into the stove is given for the insertion of a fire pot, heating coils or other parts. Along the bottom is a seat 9 in which the lower edge of the front rests. As will be seen from Fig. 2, the side or end walls of the stove are provided with lugs 12 against which the front may be bolted. A bolt 15, passing down through the top 5 and the upper part of the stove front hold them together. I also employ the loose bolts or rivets 16 for the purpose of holding in place a suitable reflector 17 which has a portion overlying the flanges 13 and 14 so that the rivets may pass down through a part of the reflector before they enter the flange 14. Just below the rivet-receiving openings 18 in the flange 14 are lugs 19 with which the lower ends of the rivets engage and by which they are steadied.

One of the purposes of my invention is to produce a stove which will heat a large amount of water, so as to supply not only a hot water tank such as it is customary to have in kitchens but also a radiator or radiators which may be located in a room other than that which contains the stove; so that the stove may be used for heating a room, for cooking purposes, for maintaining a supply of hot water, and for heating another room or rooms. To this end I have provided a large heating coil 40 which is made up of pipe extending back and forth across the back of the stove and from the front to the back on each side or end of the stove, the coil, if desired, extending substantially from the bottom to the top of the stove. By making the front of the stove removable in the manner heretofore described, the heating coil may be completed as a separate unit and tested before being placed into the stove. In the same way when it is desired to move the coil for any purpose, it is only necessary to remove the front of the stove, whereupon the coil may readily be slipped out. In the arrangement shown, the two ends of the coil are near the right hand side of and at the back of the stove, connections being made by passing the ends of the coil or suitable elbows or couplings through openings 41 in the back of the stove. In the arrangement shown, the coil is made up of ordinary iron pipe with the necessary elbows and return bends, but it will of course be understood that the coil may be constructed of a single piece of pipe, of copper or any other material, bent into the desired shape. Where copper pipe is used, it will be smaller in diameter than the iron pipe and therefore I have provided the device shown in Fig. 16 for reducing the size of the openings 41; this device consisting simply of two halves of a ring 42 hinged together at one end as at 43 and overlapping at the other end as at 44, the opening within the ring being just large enough to receive the copper pipe. The device is secured in place by screwing the hinge screw or bolt into the back of the stove so that the same part serves to hinge the two halves of the ring together and to fasten them to the stove.

In order to prevent the elements of the heating coil from sagging I have provided the back and the sides or ends of the stove with inwardly extending projections as indicated at 45 and 46; these projections being long enough to extend into the spaces between the elements of the coil when the coil is placed in the stove, and being so spaced apart that the coil will be efficiently supported from beneath at a considerable number of distributed points.

As I have heretofore explained, the stove is adapted to burn either wood or coal as a fuel. In burning wood there are no other parts inside of the stove except the heating coil. For burning coal it is necessary to have a fire pot and grate and an ash pit into which the ashes may drop.

One of the features of my invention has to do with a novel means for supporting a fire pot construction, including the grate, in such a manner that it may readily be placed in position or removed without interference with the heating coil and without making it necessary to take the heating coil out. To this end I have arranged, about midway between the top and the bottom of the stove, supporting ledges and lugs, some of which are adapted to support the fire pot directly and others of which are adapted to support detachable fire pot strips. The details of this construction are best shown in Figs. 6 to 12 inclusive, Figs. 2 and 3 showing the features in the assembled stove. Along the back of the stove is a narrow horizontal ledge 50 which is interrupted at a short distance from each end or side of the stove as indicated at 51 (see Fig. 9). Just below the point at which the ledge is interrupted are lugs 52 and, at each end of the central portion of the ledge is an inwardly projecting shoulder 53 arrested above the ledge. Along each side of the stove, at a slightly higher elevation than the ledge 50 is an inwardly-projecting, narrow ledge 54; and beneath each ledge 54 are several inwardly projecting lugs 55. Across the front of the stove is a narrow ledge 56 which is provided with open top pockets 57 and 58 near its ends and with upwardly inclined portions 59 and 60 beyond the pockets. At each side of the stove is a fire pot strip, as indicated at 61 and 62. The rear end of each strip is adapted to rest upon one of the end sections of the ledge 50, has a part 63 resting upon the lug 52, and has a shoulder 64 bearing against the shoulder or projection 53. The outer side edges of the fire pot strips are adapted to underlie the side or end ledges 54 and to rest upon the lugs or projections 55. At the front ends the fire pot strips rest within the pockets 57 and 58 and, in some instances on the members 59 and 60. On their inner edges the fire pot strips have depressed seats 65 and 66, respectively which with the ledge 56 and the central portion of the ledge 50 form a continuous seat for receiving the fire pot.

67 is a fire pot of any suitable construction having around the top thereof an outwardly projecting flange 68 which is adapted to rest upon the seat which I have just described. The fire pot strips are wide enough to extend beyond the inside of the end elements of the coils so that the coils are not in the way of the fire pot. It is not necessary to have a detachable strip at the back of the stove since the fire pot may be inserted from the front or diagonally through the top in such a manner that a wide flange 69 on the rear side of the fire pot may be slipped in between two elements of the coil. It will be seen that when the fire pot is in position there is no possibility of displacement of the strips, so that no fastening means are required for the strips, the strips being simply laid loosely in the seats provided for them. The parts are so proportioned that the fire pot strips are higher at their outer edges than at their inner edges so that coal or ashes will not collect thereon but will fall by gravity back into the fire pot.

In the arrangement shown, the front end of one of the fire pot strips encounters one of the return bends in the coil and therefore I have cut away this strip as indicated at 70 so as to leave an opening between the ledge portion 59 and the fire pot strip 62 large enough to receive the return bend in the coil. In case it is desired to dispense with the coil, this opening may be closed by a detachable piece 71 which is shaped to fit in a seat 72 at the front end of the strip 62 and is adapted to be secured by means of a bolt or screw 73 which passes down through an elongated slot 74 in the strip. When the member 71 is in place, the front end thereof overlaps the inner end of the ledge member 59 and closes the opening between this member and the main portion of the strip. Where a copper heating coil is used, the opening at the front end of the strip through which it must pass is smaller than that required for an iron pipe and therefore I have provided the member 71 with a section 75 bounded by a groove 76 which weakens the metal so that the section 75 may readily be broken out. Consequently when a copper heating coil is used, the section 75 is broken out of the member 71 and the latter is secured upon the end of the fire pot strip and is adjusted within the limits afforded by the slot 74 so as to fit about the bend in the heating coil. In the arrangement shown it happens that the right hand fire pot strip is designed to accommodate a return bend in the heating coil, but I do not desire to be limited to this arrangement, since the same principle may be applied to the left hand strip if it is desired to have the heating coil so shaped as to bring a return bend opposite the front end of the left hand strip.

In Fig. 5 I have illustrated one of the novel uses of my heating coil. It will be seen that the stove is located on one side of a partition 77 and the heating coil, in addition to being connected to the usual hot water tank, (not shown), has pipes 78 and 79 leading to a radiator 80 in a room on the opposite side of the partition; the large capacity of the heating coil permitting this extra duty to be placed upon it.

In Fig. 13 I have illustrated an arrangement for fastening the front to the sides, doing away with the lugs 12 or supplementing them. On the inner side of the front, near one or both side edges are detachably secured cleats, 95, which hook behind shoulders 96 on the interior of the sides. By unscrewing the bolts 97, with which the cleats are secured in place, the front is released from the sides.

In Figs. 14 and 15 I have illustrated an adjustable clip for engaging with the bends of the heating coil when the latter is made of a piece of copper pipe bent into shape. Each clip is made of a flat shank, 98, having a hook, 99, at one end, the hook being large enough to fit over the pipe. The shank is toothed on one side at 100 and has a slot 101 extending lengthwise thereof. At suitable points on the interior of the sides of the stove are ridges adapted to receive the teeth on the clips and cause the clips to be held firmly in any desired position. This is best shown in Fig. 10, 102 representing two ribs or beads having shoulders 103 and 104 at their ends. The shoulders 103 and 104 are just far enough apart to receive between them the shank of one of the pipe clips. Between the ribs is a bolt-opening, 105. After the coil has been put in place, the clips are hooked over its turns and are bolted in place by suitable bolts passing through the openings 105 and the slots 101, the ribs 102 engaging with the teeth on the clips, and the shoulders 103 and 104 supporting the clips in the vertical direction and assisting the teeth and ribs in holding the clips against rotation.

It will thus be seen that I have produced a novel stove construction which combines in a compact form a heating stove and a cooking stove together with a water heater of considerable capacity. It will also be seen that I have provided means which will permit the stove to be readily converted from one burning coal to one burning wood; it being only necessary, in order to change the stove from a coal stove to a wood stove to swing open the top and lift out the fire pot and fire pot strips and, if desired, changing the front. It will also be seen that I have produced various novel structural features which combine to make a stove cheaper, simpler and more efficient and afford a wide range of variations in the matter of the heating coil, the fire pot and the stove front.

While I have illustrated and described with particularity only a single structural arrangement embodying the various features of my invention, I do not desire to be limited to the exact details illustrated and described; but intend to cover all forms and arrangements which fall within the terms employed in the definitions of my invention constituting the appended claims.

I claim:

1. A stove containing a heating coil lying close to the side or end walls of the stove, lugs on said walls between the top and bottom of the coil, fire pot strips inserted between elements of said coil and engaged with said lugs, and a fire pot supported on said strips.

2. A stove containing a heating coil lying close to the side or end walls of the stove, lugs on said side walls between the top and bottom of the coil, fire pot strips inserted between elements of said coil and engaging with said lugs, and means on the front end of one of said strips for adjusting it to an adjacent return bend in said coil.

3. In combination, a stove, a heating coil arranged within the stove along the walls thereof and having a height approximately as great as the height of the stove, a fire pot, and means for supporting the fire pot within the stove at a point between the top and bottom of the coil.

4. In combination, a stove, a heating coil extending along and lying close to the side walls of the stove so as to leave the interior of the stove practically unobstructed, lugs on said side walls between the bottom and the top of the coil, fire pot strips resting loosely on said lugs, and a fire pot supported on said strips.

5. In combination, a stove having its entire front made detachable, a heating coil arranged within the stove along the rear and side walls thereof and having a height approximately as great as the height of the stove, lugs on the side walls and on the front and rear walls between the top and bottom of the coil, fire pot strips resting loosely on the lugs on the side walls, and a fire pot resting on said strips and upon the lugs on the front and rear walls.

In testimony whereof, I sign this specification in the presence of two witnesses.

AUGUSTUS F. HARTER.

Witnesses:
WILSON A. SMITH,
PETER BAUM.